(12) United States Patent
Choi

(10) Patent No.: US 7,991,350 B2
(45) Date of Patent: Aug. 2, 2011

(54) APPARATUS AND METHOD FOR AUDIO OUTPUT IN PORTABLE TERMINAL

(75) Inventor: Han-Shil Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 830 days.

(21) Appl. No.: 11/999,510

(22) Filed: Dec. 4, 2007

(65) Prior Publication Data

US 2008/0153544 A1    Jun. 26, 2008

(30) Foreign Application Priority Data

Dec. 4, 2006    (KR) .................. 10-2006-0121312

(51) Int. Cl.
    *H04H 40/00* (2008.01)
(52) U.S. Cl. .... 455/3.06; 455/41.3; 455/149; 455/550.1
(58) Field of Classification Search ............... 455/3.06, 455/41.3, 149, 550.1, 556.1, 126, 133, 137
    See application file for complete search history.

(56) References Cited

U.S. PATENT DOCUMENTS

| | | | | |
|---|---|---|---|---|
| 6,466,634 | B1* | 10/2002 | O'Toole et al. | 375/374 |
| 6,947,513 | B2* | 9/2005 | O'Toole et al. | 375/374 |
| 7,512,385 | B2* | 3/2009 | Tso et al. | 455/118 |
| 7,646,621 | B2* | 1/2010 | Kent | 363/147 |
| 2004/0073640 | A1* | 4/2004 | Martin et al. | 709/223 |
| 2005/0100145 | A1* | 5/2005 | Spencer et al. | 379/88.22 |
| 2006/0040631 | A1* | 2/2006 | Tso et al. | 455/255 |
| 2006/0206582 | A1* | 9/2006 | Finn | 709/217 |
| 2007/0132665 | A1* | 6/2007 | Kent | 345/45 |
| 2007/0282748 | A1* | 12/2007 | Saint Clair et al. | 705/51 |
| 2008/0118009 | A1* | 5/2008 | Chuang et al. | 375/340 |
| 2008/0168326 | A1* | 7/2008 | Hwang et al. | 714/758 |
| 2009/0258610 | A1* | 10/2009 | Kuo et al. | 455/102 |
| 2010/0121566 | A1* | 5/2010 | Joshi et al. | 701/202 |
| 2010/0177837 | A1* | 7/2010 | Leonidovich et al. | 375/267 |

FOREIGN PATENT DOCUMENTS

| | | |
|---|---|---|
| KR | 20-0355379 | 6/2004 |
| KR | 1020040093244 | 11/2004 |
| KR | 1020060017160 | 2/2006 |
| KR | 1020070006182 | 1/2007 |

* cited by examiner

*Primary Examiner* — Minh D Dao
(74) *Attorney, Agent, or Firm* — The Farrell Law Firm, P.C.

(57) ABSTRACT

An apparatus and method for outputting audio in a portable terminal are provided. The apparatus includes a communication module for transmitting/receiving a call connection request and speech signals during a call connection service; an audio processor connected to at least one audio output device, for controlling the output audio data/speech signals through the audio output device, which is a first audio output device, and checking whether another audio output device is connected; and a controller for checking at the audio processor whether there is another audio device, which is a second audio output device, for outputting the speech signals received while outputting the audio data of an application service through the first audio output device, and when there is the second audio output device, for controlling the output of the speech signals through the second audio output device.

16 Claims, 2 Drawing Sheets

APPARATUS AND METHOD FOR AUDIO OUTPUT IN PORTABLE TERMINAL

PRIORITY

This application claims priority under 35 U.S.C. §119(a) to a Korean Patent Application filed in the Korean Intellectual Property Office on Dec. 4, 2006 and assigned Serial No. 2006-121312, the contents of which are incorporated herein by reference.

BACKGROUND OF THE INVENTION

1. Field of the Invention

The present invention relates generally to an audio output apparatus and method for a portable terminal, and in particular, to an audio output apparatus and method that can output speech signals received during call connection through another audio output device without stopping an audio output device from outputting audio data of a Digital Multimedia Broadcasting (DMB) program, a moving picture, or music.

2. Description of the Related Art

Today, use of portable terminals such as mobile communication terminals and Personal Digital Assistants (PDAs) is common. The portable terminals are typically used not only for simple call connection or scheduling but also for taking a still picture or moving picture with a digital camera module mounted thereon, watching a Digital Multimedia Broadcasting (DMB) program, editing a document, playing games, navigation, listening to music, and transmitting/receiving a Short Message Service (SMS) or a multimedia message including the photographed picture or moving picture. Thus, the applicability range of portable terminals becomes wider day-by-day.

In particular, when a call connection request is received and a call is connected in the middle of presenting the DMB program, conventional portable terminals capable of providing a DMB service stop presenting the DMB program to provide a call connection service, or continues to output video data of the DMB program and provides the call connection service, while stopping the output of audio data of the DMB program.

When more than two users watch a DMB program with one portable terminal and a call is connected upon receipt of a call connection request, a user who is not involved in the call communication cannot watch the DMB program that he/she has been watching or watch only video data of the DMB program without hearing the audio.

The above program is not limited a DMB program, but it may occur when a call connection request is received or transmitted for call connection while audio data are outputted such as, for example, when watching a pre-stored moving picture or listening to music.

Therefore, there is needed an apparatus and method for providing a call connection service through transmission/reception of a call connection request without stopping the output of the audio data in a portable terminal.

SUMMARY OF THE INVENTION

An aspect of the present invention is to substantially solve at least the above problems and/or disadvantages and to provide at least the advantages below. Accordingly, one aspect of the present invention is to provide an apparatus and method for the output of audio in a portable terminal.

Another aspect of the present invention is to provide an apparatus and method for providing a call connection service through transmission/reception of a call connection request in a portable terminal without stopping output of audio.

A further aspect of the present invention is to provide an apparatus and method for the output of speech signals to provide a call connection service through another audio output device, which is not an audio output device involved in the output of audio data, when a call connection request is transmitted/received in a portable terminal.

According to one aspect of the present invention, there is provided an apparatus for the output of audio in a portable terminal. The apparatus includes a communication module for transmitting/receiving a call connection request and transmitting/receiving speech signals when a call connection service is provided; an audio processor connected to at least one audio output device for controlling the output audio data or the received speech signals through the audio output device, which is a first audio output device, and checks whether another audio output device for the output of audio is connected upon receipt of a request; and a controller for checking at the audio processor whether there is another audio device, which is a second audio output device, available for the output of the speech signals received through the communication module upon sensing a call connection event in the middle of the output of the audio data generated from an application service through the connected first audio output device, and, when there is the second audio output device, for controlling the output of the speech signals received during the call connection service through the second audio output device.

According to another aspect of the present invention, there is provided a method for the output of audio in a portable terminal. The method includes sensing a call connection event in the middle of the output of the audio data generated from an application service through a connected audio output device, which is a first audio output device; upon sensing the call connection event, searching another audio output device, which is a second audio output device, to output speech signals received during a call connection service; and, when the second audio output device is found after searching, outputting the speech signals received during the call connection service through the second audio output device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an audio output apparatus and method that can output speech signals for a call connection service through another audio output device, when a user watches a Digital Multimedia Broadcasting (DMB) program or moving picture, or listens to music with a portable terminal and a call connection request is received in the middle of the output of audio data of the DMB program, moving picture, or music. The structure of the apparatus and method is described below with reference to FIG. 1.

Figure 1:
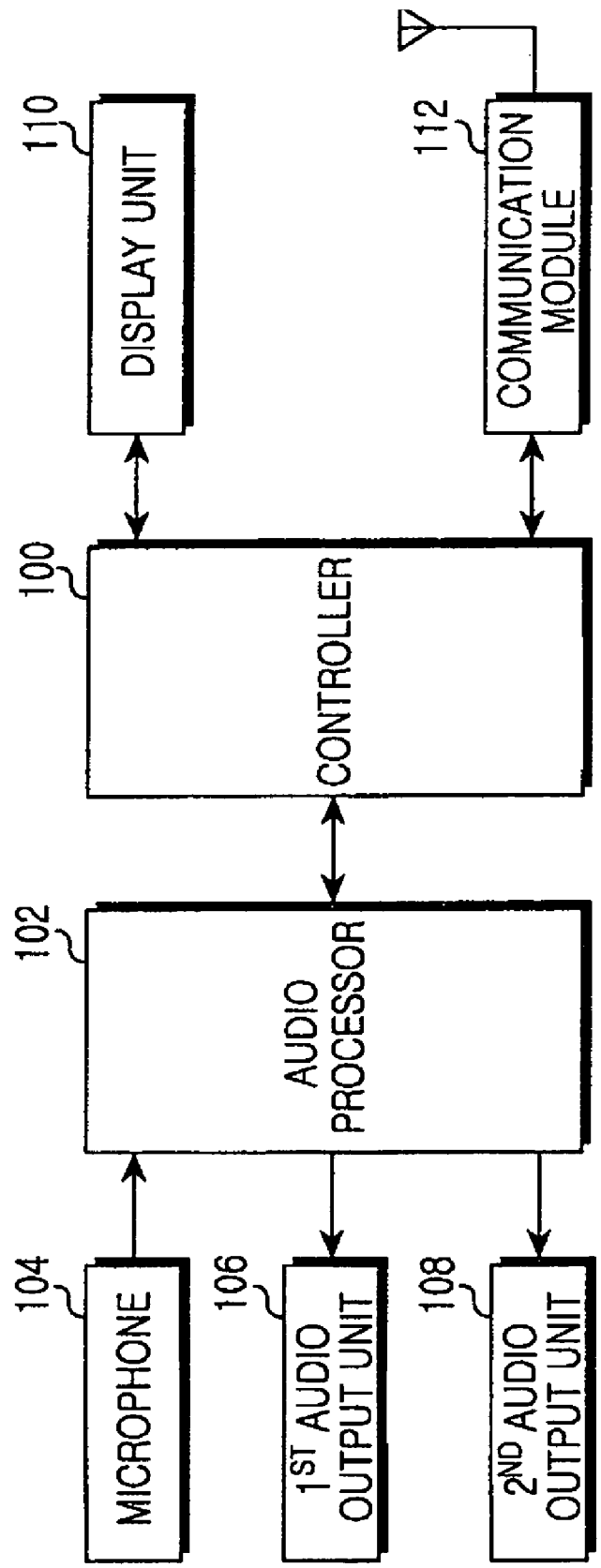
FIG. 1 illustrates a structure of a portable terminal capable of providing a call connection service in the middle of the output of the audio data according to the present invention.

FIG. 1 illustrates a structure of a portable terminal capable of providing a call connection service in the middle of outputting audio data according to the present invention. In the present specification, non-limiting examples of the portable terminal include a cellular phone, a Personal Communication System (PCS), a Personal Digital Assistant (PDA), an International Mobile Telecommunication 2000 (IMT-2000) terminal, and a $4^{th}$ Generation terminal, e.g., an Orthogonal Frequency Division Multiplexing (OFDM). The present invention is described below with the above portable terminals having a general structure.

In FIG. 1, the portable terminal of the present invention includes a controller 100, an audio processor 102, a microphone 104, a first audio output unit 106, a second audio output unit 108, a display unit 110, and a communication module 112.

The display unit 110 displays state information, or an indicator, that is generated during terminal operation, predetermined numbers, and texts, moving picture, and still picture. The display unit 110 may be a color Liquid Crystal Display (LCD).

The communication module 112 transmits/receives a call connection request and speech data during a call connection service. During signal reception, the communication module 112 down-converts the frequency of Radio Frequency (RF) signals received through an antenna, despreads the received signals, and performs channel decoding onto the despread signals. During signal transmission, the communication module 112 performs channel coding onto data, spreads the coded data, up-converts frequency of the data, and transmits them through an antenna.

The audio processor 102 transforms electrical signals inputted from the microphone 104 during the call connection service into speech data by modulating the electrical signals, and provides the speech data to the controller 100. The audio processor 102 also demodulates coded speech data received from communication module 112 into electrical signals, and controls the output the electrical signals through the first audio output unit 106 or the second audio output unit 108 which is connected under the control of the controller 100.

In addition, the audio processor 102 checks out the presence of an available audio output unit under the control of the controller 100, and performs control to output audio data through the first audio output unit 106 or the second audio output unit 108 when a user watches a Digital Multimedia Broadcasting (DMB) program or a moving picture, or listens to music.

The audio processor 102 may include a codec to transform digital audio data received through the communication module 112 into analog data or transform analog data received from the microphone 104 into digital audio data. The codec may be realized to be included in the audio processor 102.

The first and second audio output units 106 and 108 output audio data. Representative examples of the first and second audio output units 106 and 108 include a speaker and an earphone. Generally, portable terminals are designed to include a speaker mounted therein and an earphone attachable as an external device. In one embodiment of the present invention, the first audio output unit 106 is realized as a built-in speaker for the sake of convenience in explanation, whereas the second audio output unit 108 is an external earphone.

When the controller 100 senses the transmission/reception of a call connection request in the middle of outputting audio data through the first audio output unit 106 or the second audio output unit 108, the controller 100 checks at the audio processor 102 whether there is an audio output unit that can output audio data but does not output audio data. If there is an audio output unit available for outputting audio, the controller 100 then controls the output of the speech signals received when the call connection service is provided through the available audio output unit.

Also, when there is no other audio output unit available for the output of the audio, the controller 100 performs control to output a message requesting to connect another audio output unit for outputting the speech signals received during the call connection service on the display unit 110. The connection request message requesting to connect another audio output unit informs a user that another audio output unit needs to be connected, such as "please, connect an earphone."

A method for the output of audio in a portable terminal is described below according to the present invention.

Figure 2:
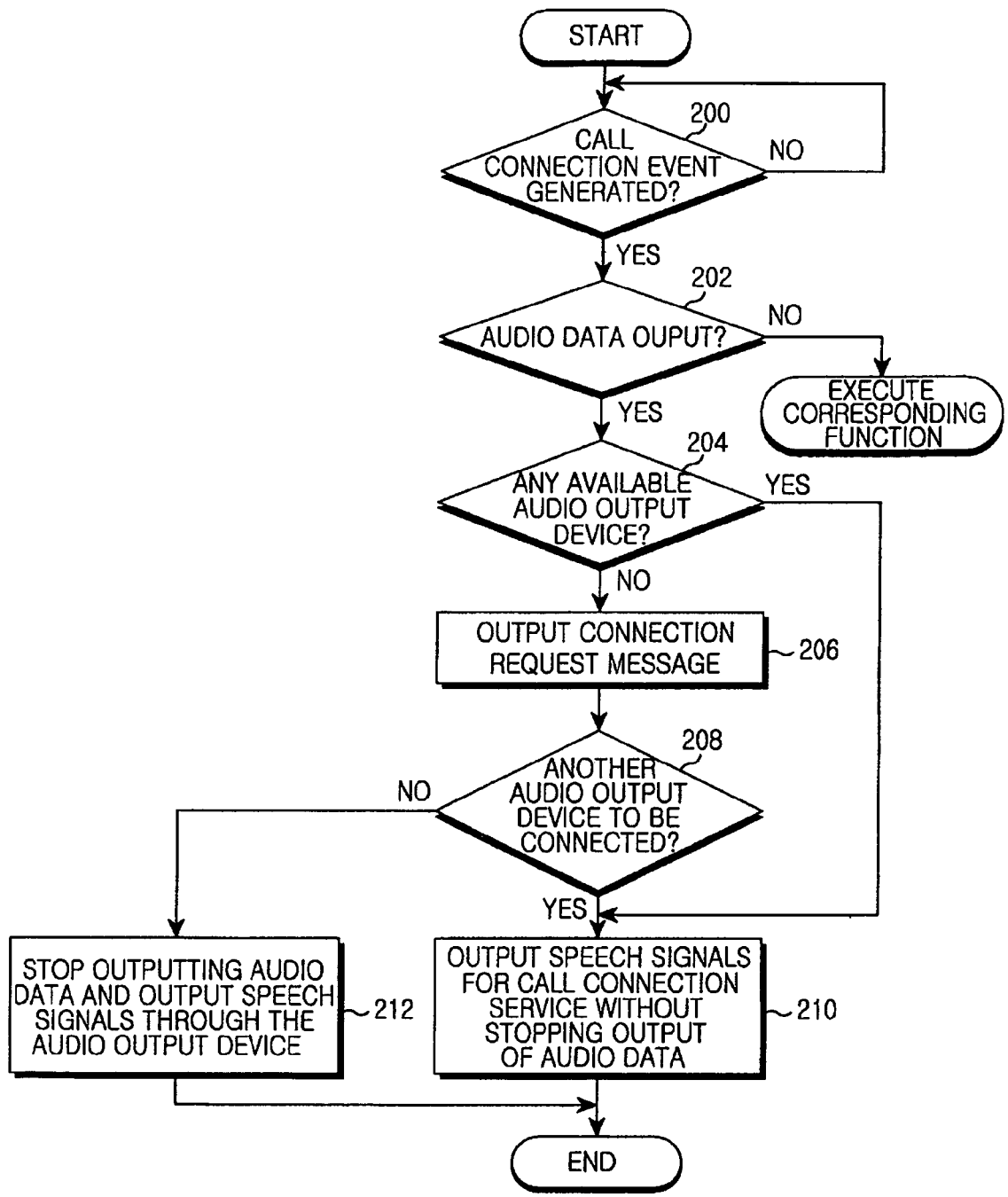
FIG. 2 is a flowchart illustrating a process of providing a call connection service in a portable terminal in the middle of the output of the audio data according to the present invention.

FIG. 2 is a flowchart illustrating a process of providing a call connection service in a portable terminal in the middle of the output of the audio data according to the present invention.

In FIG. 2, when the portable terminal senses the generation of a call connection event requesting to transmit or receive a call connection request in step 200, the portable terminal checks whether audio data generated when the user watches a DMB program or a moving picture, or listens to music are output in step 202. A non-limiting example of an audio output device that outputs audio data is a speaker.

When it turns out in step 202 that there is no output of audio data, the portable terminal outputs the speech signals received during the call connection service upon generation of the call connection event in step 200 through an available audio output device according to a priority order.

However, when it turns out in step 202 that there are audio data outputted, the portable terminal checks in step 204 whether there is an audio output device available for the output of the speech signals received during the call connection service. When the audio output device currently involved in the output of the audio data is a speaker, an example of another audio output device available for the output of the speech signals is an earphone. In short, step 204 checks whether there is another audio output device connected, e.g., the earphone, other than the built-in speaker, which is currently involved in the output of the audio data.

When it turns out in step 204 that there is another audio output device available, the portable terminal does not stop the current output of the audio data but outputs the speech signals received during the call connection service upon the generation of the call connection event through the available audio output device, in step 210.

When it turns out in step 204 that there is no other audio output device available, the portable terminal outputs a message requesting to connect another audio output device for the output of the speech signals in step 206. In step 208, the portable terminal checks whether another audio output device is connected. When it turns out, in step 208, that there is another audio device connected, the portable terminal does not stop the output of the audio data but outputs the speech signals received during the call connection service upon the generation of the call connection event, through the newly connected audio output device in step 210. An example of sensing the connection of another audio output device in step 208 is sensing the connection of an earphone, which is a substitute external audio output device.

When the connection of another audio output device is not sensed in step 208, the portable terminal stops the output of the audio data and outputs the speech signals received during the call connection service upon the generation of the call connection event, through the audio output device in step 212.

For example, when the portable terminal outputs the audio data of the DMB program through the speaker and when a call connection request is received while the user watches the DMB program, the portable terminal provides the call connection service by continuing to output the audio data of the DMB program through the speaker and by outputting the speech signals through the earphone.

The present invention described above provides an audio output apparatus and method that can output speech signals received during the call connection through an audio output device which is not an audio output device involving in output of a Digital Multimedia Broadcasting (DMB) program, a moving picture, or music, when a user watches the DMB program or moving picture, or listens to the music with the portable terminal and a call connection request is received in the middle of the output of the audio of the DMB program, moving picture, or music.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for outputting audio in a portable terminal, comprising:
    a communication module for transmitting/receiving a call connection request and transmitting/receiving speech signals when a call connection service is provided;
    an audio processor connected to at least one audio output device, controlling the output of the audio data or the received speech signals through the audio output device, which is a first audio output device, and checking whether another audio output device for outputting audio is connected upon receipt of a request; and
    a controller for checking at the audio processor whether there is another audio output device, which is a second audio output device, available for outputting the speech signals received through the communication module upon sensing a call connection event in the middle of outputting the audio data generated from an application service through the connected first audio output device, and when there is the second audio output device, for controlling the output of the speech signals received during the call connection service through the second audio output device.

2. The apparatus of claim 1, wherein when there is no other audio output device, the controller outputs a message requesting to connect another audio output device, which is the second audio output device, and when the connection of the second audio output device is sensed through the audio processor, the controller controls the output of the speech signals received during the call connection service through the second audio output device.

3. The apparatus of claim 2, wherein when the connection of the second audio output device is not sensed after the message requesting to connect another audio output device is outputted, the controller stops outputting the audio data through the first audio output device and outputs the speech signals received during the call connection service.

4. The apparatus of claim 2, wherein the first audio output device for outputting the audio data generated from the application service is a speaker mounted in the portable terminal, and the second audio output device is a detachable earphone.

5. The apparatus of claim 1, wherein the application service is a service for outputting the audio data, and wherein the application service comprises a Digital Multimedia Broadcasting (DMB) service, a moving picture service, and a music service.

6. The apparatus of claim 1, wherein the call connection event comprises transmission of the call connection request and reception of the call connection request.

7. The apparatus of claim 1, wherein the first audio output device for outputting the audio data generated from the application service is a detachable earphone, and the second audio output device is a speaker mounted in the portable terminal.

8. A method for outputting audio in a portable terminal, comprising:
    sensing a call connection event in the middle of outputting audio data generated from an application service through a connected audio output device, which is a first audio output device;
    upon sensing the call connection event, searching for another audio output device, which is a second audio output device, for outputting speech signals received during a call connection service; and
    when the second audio output device is found after searching, outputting the speech signals received during the call connection service through the second audio output device.

9. The method of claim 8, further comprising:
    when there is no other audio output device searched, outputting a message requesting to connect another audio output device; and
    when connection of another audio output device, which is a second audio output device, is sensed after the output of the connection request message, outputting the speech signals received during the call connection service through the second audio output device.

10. The method of claim 9, further comprising:
    when connection of another audio output device is not sensed after the output of a connection request message, stopping the first audio device from outputting the audio data; and
    outputting the speech signals received during the call connection service through the first audio output device, which has stopped outputting the audio data.

11. The method of claim 9, wherein the first audio output device for outputting the audio data generated from the application service is a speaker mounted in the portable terminal, and the second audio output device is a detachable earphone.

12. The method of claim 8, wherein the application service is a service for outputting the audio data, and wherein the application service comprises a Digital Multimedia Broadcasting (DMB) service, a moving picture service, and a music service.

13. The method of claim 8, wherein the call connection event comprises transmission of the call connection request and reception of the call connection request.

14. The method of claim 8, wherein the first audio output device for outputting the audio data generated from the application service is a detachable earphone, and the second audio output device is a speaker mounted in the portable terminal.

15. An apparatus for outputting audio in a portable terminal, comprising:

means for sensing a call connection in the middle of outputting audio data generated from an application service through a first audio output device;

means for searching for a second audio output device for outputting speech signals received during a call connection service; and means for outputting the speech signals received during the call connection service through the second audio output device.

16. A non-transitory computer-readable recording medium having recorded thereon a program for outputting audio in a portable terminal, comprising:

a first code segment, for sensing a call connection in the middle of outputting audio data generated from an application service through a first audio output device;

a second code segment, for searching for a second audio output device for outputting speech signals received during a call connection service; and a third code segment, for outputting the speech signals received during the call connection service through the second audio output device.

* * * * *